Aug. 9, 1949.  A. N. SPANEL  2,478,599
ART OF PRODUCING A COATING OF LATEX FOAM
AND RESULTING LATEX ARTICLE
Filed Dec. 6, 1945  3 Sheets-Sheet 1
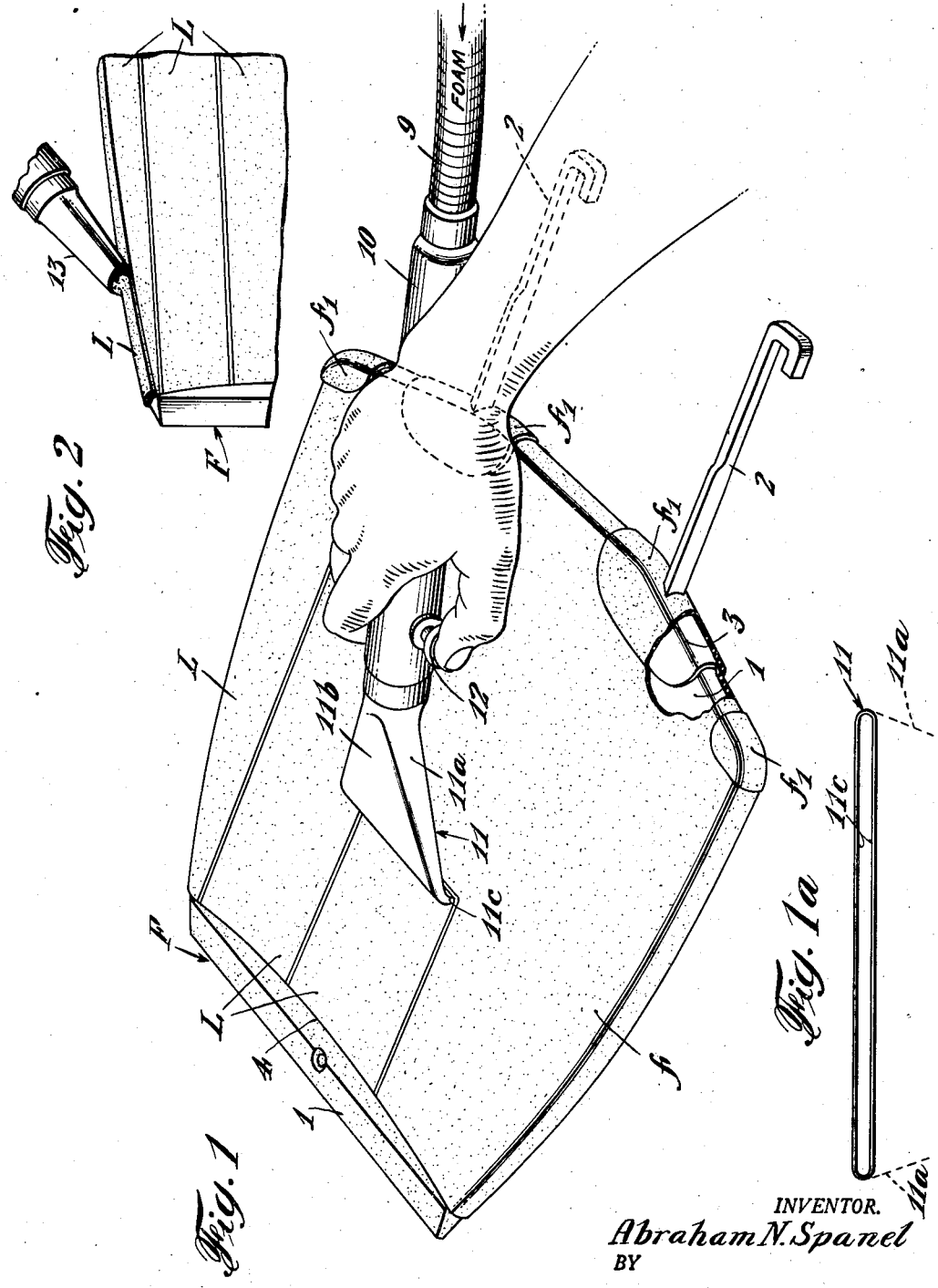
INVENTOR.
Abraham N. Spanel
BY
Ward, Crosby & Neal
ATTORNEYS Aug. 9, 1949.  A. N. SPANEL  2,478,599
ART OF PRODUCING A COATING OF LATEX FOAM
AND RESULTING LATEX ARTICLE
Filed Dec. 6, 1945  3 Sheets-Sheet 2
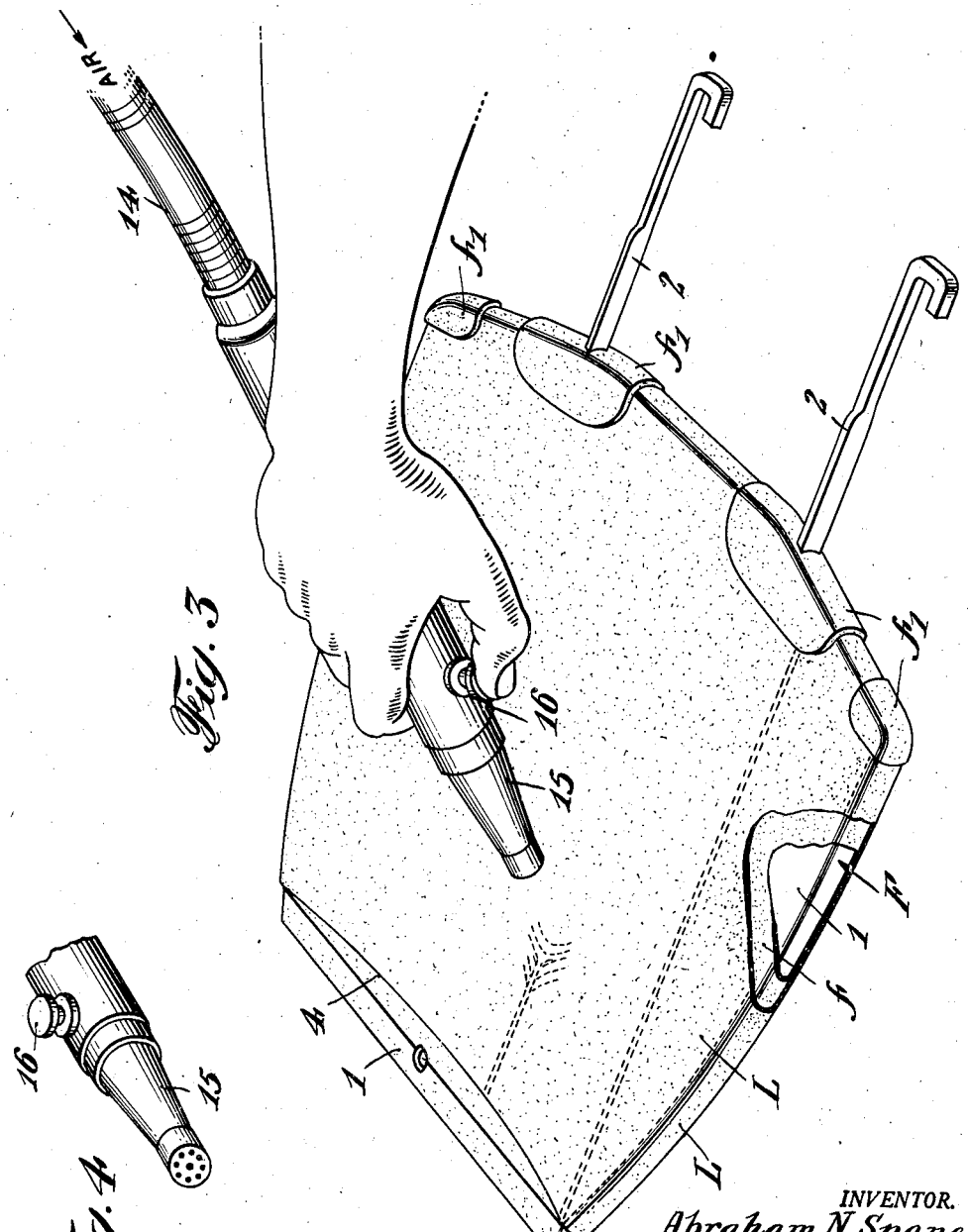
INVENTOR.
Abraham N. Spanel
BY
Ward, Crosby & Neal
ATTORNEYS Aug. 9, 1949. A. N. SPANEL 2,478,599
ART OF PRODUCING A COATING OF LATEX FOAM
AND RESULTING LATEX ARTICLE
Filed Dec. 6, 1945 3 Sheets-Sheet 3
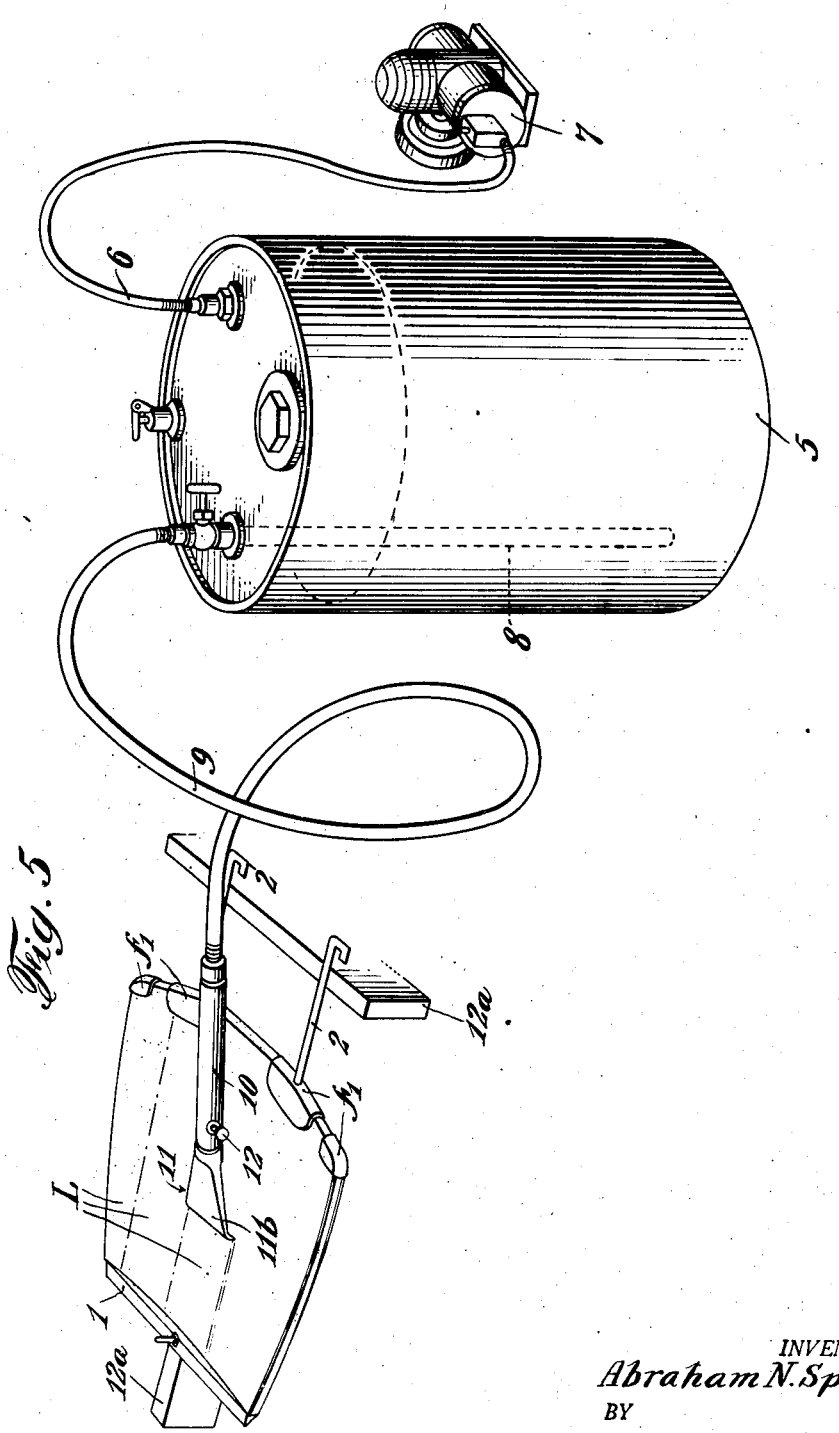
INVENTOR.
Abraham N. Spanel
BY
Ward, Crosby & Neal
ATTORNEYS Patented Aug. 9, 1949

2,478,599

UNITED STATES PATENT OFFICE 2,478,599

ART OF PRODUCING A COATING OF LATEX FOAM AND RESULTING LATEX ARTICLE

Abraham N. Spanel, Princeton, N. J.

Application December 6, 1945, Serial No. 633,082

11 Claims. (Cl. 117—139)

My invention relates to the art of producing a coating or covering of latex foam on a rubber or latex film and to the resulting latex article.

Latex articles embodying a rubber or latex film and an adhering coating or covering of latex foam are well known in the art and it is also known that such articles may be produced by dipping a form a suitable number of times first into a liquid latex solution and then into a latex foam solution. In accordance with the present invention, layers of latex foam are deposited, otherwise than by dipping operation, in adhering engagement with a rubber or latex film on a form to thereby produce a latex foam coating or covering on the latex film. This practice, as hereinafter described, is advantageous for various reasons as will be understood by those skilled in the art.

My invention has further reference to a method of eliminating the line of demarcation existing between side-by-side layers of latex foam deposited on a latex film in contacting edge relation or substantially so.

Various other objects, advantages and features of the invention will become apparent from the following detailed description.

My invention resides in the art of producing a coating of latex foam, in the art of producing a latex article and in the resulting latex article.

For an understanding of my invention, reference is to be had to the accompanying drawings, in which:

Figure 1 is a perspective view illustrating a step of my novel method;

Fig. 1a is a perspective view illustrating a nozzle orifice;

Fig. 2 and 3 are perspective views illustrating other steps of my novel method;

Fig. 4 is a perspective view showing the nozzle illustrated in Fig. 3; and

Fig. 5 is a perspective view showing apparatus utilizable for applying extruded foamed latex.

In general, my invention has reference to a novel method of producing a latex foam coating. More particularly, the invention relates to a method of producing a rubber or latex article embodying a rubber or latex film and an adhering coating or covering of latex foam. In accordance with the invention, there may be produced rubber or latex articles of any suitable or desired character such, for example, as girdles, gloves, bathing caps, supports for parts of the human body, etc. For purposes of explanation, I have illustrated and described the invention in connection with the production of a girdle. It shall be distinctly understood, however, that the invention is not to be thus limited since, as stated, various other types of rubber or latex articles may be produced by my novel method as desired.

Referring to the drawings, I have shown a form F utilizable, in the manner hereinafter described, for the production of a girdle. The form F may be of any suitable character such, for example, as illustrated in U. S. Letters Patent No. 2,360,736 and, hence, consist of a plane member 1 formed from metal, or equivalent, and having a pair of supporting members 2 secured to the top thereof. As shown, the member 1 has plane front and rear surface together with curved sides and, in a known manner, said member 1 comprises bosses or pads 3 defined, respectively, by peripheral sharp edges utilizable as hereinafter described. The number 1 further comprises surfaces 4 adapted, during the dipping operation, to form the reinforced upper girdle surface.

As a first step in the production of the girdle, the form F is dipped one or more times in an aqueous dispersion of rubber, either natural or synthetic, which may include numerous well known ingredients better adapting it for dipping purposes, this aqueous dispersion of rubber being hereinafter generically termed a "liquid latex dispersion." After each dipping operation, the deposited film on the form F is dried to suitable extent and, as a result, there is obtained on the exterior surface of said form F a rubber or latex layer or film $f$ having desired thickness and hereinafter generically termed a "latex film." During the dipping operations, the aforesaid bosses or pads 3 produce raised latex film sections $f1$ which are bordered, respectively, by narrow grooves or channels produced by the peripheral sharp edge of the bosses or pads 3, respectively. Accordingly, as well understood in the art, the latex film section $f1$, covered with latex foam as hereinafter described, may readily be cut or otherwise detached from the main body of the latex film after the latter is stripped from the form F to thereby form openings in the lower girdle section.

In accordance with my invention, after the aforesaid latex film $f$ has been suitably dried, before any substantial vulcanization thereof has been effected and, preferably although not necessarily while it still remains on the form F, the outer surface thereof is covered to suitable extent with latex foam. This is accomplished in a novel manner as hereinafter described.

As illustrative of one method and one form of apparatus suitable for this purpose, reference is to be had to Fig. 5 wherein I have shown any suitable tank or receptacle 5 which contains a supply of latex foam of any suitable character and formed in any suitable manner. Peferably, however, the latex foam in the tank 5 is substantially unvulcanized and of the character described in U. S. Letters Patent 2,321,111. A pipe or conduit 6 communicates with the tank 5 above the upper level of the latex foam, this pipe 6 being traversed by air under suitable pressure established and maintained, for example, by a motor-driven compressor 7. Supported vertically in the tank 5 is a pipe 8 which, at its lower end, terminates closely adjacent the bottom of said tank 5. One end of a flexible tube or conduit 9 is connected to the upper end of the pipe 8, the other end of said tube 9 being connected to a tubular support 10 for a nozzle 11. The tubular support 10 carries a valve actuatable by a button 12 which, normally is so positioned under spring pressure that the passage defined by said tubular support 10 is closed. However, by manual depression of the button 12, the valve may be operated to open the passage through said tubular support 10.

The nozzle 11 is carried by the tubular support 10. In a direction extending from said tubular support 10, the nozzle sides 11a diverge whereas the top and bottom nozzle wall surfaces 11b converge. As a result, the orifice or outlet section 11c of the nozzle has width many times that of its height and, as shown in Fig. 1a, the height of the nozzle orifice is uniform throughout the width thereof. Preferably, as shown in Figs. 1 and 5, the nozzle orifice is angularly related to the body of the nozzle.

After the form F has been dipped as described above to obtain the latex film f thereon and, as stated, after the latter has been suitably dried and before any substantial vulcanization thereof has been effected, said form F, with the latex film f in engagement therewith, may be disposed in a horizontal position on suitable supports 12a, Fig. 5.

Assuming that proper air pressure is maintained in the tank 5, the operator, in accordance with the invention, grasps the tubular support 10 as shown in Fig. 1, depresses the button 12 to open the valve associated therewith and, while maintaining the nozzle orifice 11c close to the upper surface of the latex film f, moves the nozzle 11 preferably although not necessarily lengthwise of the form F. As a result, under the control of the air pressure previously established in the tank 5, latex foam passes through the pipe 8, tube 9, tubular support 10, nozzle 11 and is extruded as a layer in the form of a ribbon L of latex foam which is deposited on said upper surface of the latex film f. Thereupon, successively and in the manner described, additional layers of latex foam L are extruded from the nozzle 11 and deposited on the latex film f until, eventually, the upper surface thereof is entirely covered with latex foam. It is characteristic of the invention, then, that the ribbons of latex foam are disposed in side-by-side relation on that section of the latex film f which engages one surface of the form F and, in this connection, it is to be noted that the edges of adjacent ribbons of the foam are disposed in contacting relation or substantially so.

By the operation described above, the latex film f on one surface of the form F is covered with latex foam. After this has been completed, the form F may be turned over and, as described, ribbons of latex foam are extruded and deposited in side-by-side relation on that section of the latex film f which engages that surface of the form F which is now uppermost.

Thereupon, the form F may be supported in a vertical plane, Fig. 2, and a nozzle 13 having a width corresponding with the width of the form side is utilized to extrude and deposit a narrow ribbon L of latex foam on that section of the latex film f which engages the uppermost form side. Finally, the position of the form F may be reversed to bring the other side thereof uppermost whereupon the latex film section engaging said last named form side is covered with latex foam by utilization of the nozzle 13. If desired, in the crotch area of the girdle, by utilization of a suitable nozzle, latex foam may be applied to the latex film section in engagement with the top form surface which is transversely disposed between the sets of pads 3.

As stated above, the latex foam is applied to those sections of the latex film f engaging the respective surfaces of the form as side-by-side ribbons L which are disposed closely adjacent each other or in contacting relation. Hence, as shown on the drawing, there is a line of demarcation, more or less distinct, between each adjacent pair of latex foam layers. These lines of demarcation should be eliminated and this may be accomplished in any suitable manner.

As one suitable arrangement for accomplishing this purpose, reference is to be had to Figs. 3 and 4 wherein there is shown a hose 14 and an associated nozzle 15, the passage through the nozzle being controlled by a valve actuatable by a button 16. Before there has been any substantial drying of the extruded latex foam, the form F is suitably supported in its various positions and, then, with the hose 14 connected to a source of air under suitable pressure, the operator grasps the nozzle 15, depresses the button 16 and causes the emitted stream of air to engage, in turn, each of the aforesaid lines of demarcation and the surfaces contiguous thereto. As a result, the lines of demarcation noted above are substantially or entirely eliminated. This feature of the invention is shown in the upper part of Fig. 3.

As at present preferred, although not necessarily, the dimensions of the orifice 11c of the nozzle 11 may be such that the extruded ribbon of latex foam has a thickness of ⅛ inch more or less and a width as large as practical such, for example, as a width ranging between three and four inches more or less. The ribbon of latex foam extruded from the nozzle 13 should have a thickness the same as described above and the width thereof should correspond with the width of the form F.

Aside from the foregoing, the thickness of the deposited latex foam will depend, to some extent, upon the speed with which the nozzle is moved with respect to the mold. Thus, rapid movement of the nozzle decreases the thickness of the deposited latex foam. Movement of the nozzle at a speed slower than the rate of foam extrusion results in the deposition of latex foam having a thickness greater than the thickness of the foam emerging from the nozzle.

After completion of the operations described above, the latex film f and the adhering latex foam coating may be vulcanized together on the form F. However, if prevulcanized materials have been used, it is only necessary to properly dry the latex foam coating before removing the girdle from the form. Thereafter, the girdle is stripped from the form F and, ordinarily, is turned inside out before it is worn. When thus worn, the latex foam coating of the girdle directly engages the skin of the wearer, this being advantageous and desirable for known reasons.

It shall be understood that the invention is not to be limited to the application of the extruded layers of latex foam to the latex film *f* while the latter is on the form F. If desired, the latex film *f* may be stripped from the form and, while suitably supported, the layers of latex foam may be extruded thereon.

In the disclosed form of the invention, the direction of nozzle movement is longitudinally of the girdle or form. The invention is not to be thus limited. Thus, for example, the nozzle movement during the latex foam extrusion operation may be transversely of the girdle or form.

As regards broad aspects of the invention, it shall be understood that layers or sheets of latex foam may be applied to different respective portions of the latex film *f* otherwise than by extrusion from one or more nozzles.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. In the art of producing a latex article, the steps which consist in laying a ribbon of latex foam in engagement with a part of the surface of a supported latex film, and thereafter laying another ribbon of latex foam in engagement with another part of the surface of said latex film contiguous the area covered by said first ribbon, said ribbons being laid in side-by-side relation, whereby a layer of latex foam is provided having a thickness of a single ribbon and a width of a plurality of said ribbons.

2. In the art of producing a latex article, the steps which consist in laying a ribbon of latex foam in engagement with a part of the surface of a supported latex film, and thereafter laying another ribbon of latex foam in engagement with another part of the surface of said latex film, said ribbons of latex foam being in contacting edge-to-edge relation or substantially so, whereby a layer of latex foam is provided having a thickness of a single ribbon and a width of a plurality of ribbons.

3. In the art of producing a latex article, the steps which consist in laying a ribbon of substantially unvulcanized latex foam in engagement with a part of the surface of a supported substantially unvulcanized latex film, and thereafter laying another ribbon of substantially unvulcanized latex foam in engagement with another part of said latex film contiguous the area covered by said first ribbon, said ribbons being laid in side-by-side relation, whereby a layer of latex foam is provided having a thickness of a single ribbon and a width of a plurality of said ribbons.

4. In the art of making a latex article, the steps which consist in producing a latex film on the exterior surface of a form, supporting the form with one surface thereof uppermost, laying at least one ribbon of latex foam on the upwardly facing section of the latex film, supporting the form with another surface thereof uppermost, and laying at least one ribbon of latex foam on that section of the latex film which faces upwardly when the form is in the position last specified.

5. In the art of producing a latex article, the steps which consist in laying successive ribbons of latex foam in side-by-side relation and in engagement with one surface of a latex film to which said ribbons of latex foam adhere with a line of demarcation between contiguous edges of said successive ribbons, and thereafter applying pressure to the region of said contiguous edges and thereby eliminating the line of demarcation before substantial drying of the latex foam has occurred.

6. In the art of making a latex article, the steps which consist in producing a latex film which has sections engaging, respectively, the front, rear and side surfaces of a form, successively laying a plurality of ribbons of latex foam of substantially uniform thickness on the respective latex film sections in engagement with the front and rear surfaces of said form, and laying a ribbon of latex foam of substantially uniform thickness on each latex film section in engagement with a side surface of said form.

7. In the art of making a latex article, the steps which consist in producing a latex film on the exterior surface of a form, laying successive ribbons of latex foam of substantially uniform thickness in engagement with one surface of said latex film, said ribbons of latex foam adhering to the latex film with a line of demarcation between contiguous edges of said successive ribbons, and thereafter applying pressure along the zone of said contiguous edges and thereby eliminating the line of demarcation before substantial drying of the latex foam has occurred.

8. In the art of making a latex article, the steps which consist in producing a latex film on the exterior surface of a form, laying successive ribbons of latex foam of substantially uniform thickness in side-by-side relation and in engagement with a plane surface of said latex film, said ribbons of latex foam adhering to the latex film with a line of demarcation between contiguous edges of said successive ribbons, and thereafter applying pressure to the zone of said contiguous edges and thereby eliminating the line of demarcation before substantial drying of the latex foam has occurred.

9. In the art of making a latex article, the steps which consist in producing a latex film on the exterior surface of a form, depositing successive ribbons of latex foam of substantially uniform thickness in side-by-side relation and in engagement with a plane surface of said latex film, said ribbons of latex foam adhering to the latex film with a line of demarcation between contiguous edges of said successive ribbons, and thereafter, before substantial drying of the latext foam has occurred, directing a gaseous stream on the line of demarcation and the contiguous latex foam surfaces.

10. In the art of making a latex article, the steps which consist in producing a latex film on the exterior surface of a form, supporting the form with one plane surface thereof uppermost, laying a plurality of ribbons of latex foam in side-by-side relation on the upwardly facing section of the latex film, supporting the form with another plane surface thereof uppermost, laying a plurality of ribbons of latex foam on that section of the latex film which faces upwardly when the form is in the position last specified, and thereafter applying ribbons of latex foam to the respective sections of the latex film which engage the curved sides of the form, respectively.

11. In the art of making a latex article, the steps which consist in producing a latex film on the exterior surface of a form, supporting the form with one plane surface thereof uppermost, laying a plurality of ribbons of latex foam in side-by-side relation on the upwardly facing section of the latex film, supporting the form with another plane surface thereof uppermost, laying a plurality of ribbons of latex foam on that section of the latex film which faces upwardly when the form is in the position last specified, thereafter applying ribbons of latex foam to the respective sections of the latex film which engage the curved sides of the form respectively, adjacent ribbons of the latex foam being in edge-to-edge contacting relation or substantially so with a line of demarcation between them, and, before substantial drying of the latex foam has occurred, directing a gaseous stream on each line of demarcation and the contiguous latex foam surfaces.

ABRAHAM N. SPANEL.

REFERENCES CITED

The following references are of record in the file of this patent:

UNITED STATES PATENTS

| Number | Name | Date |
| --- | --- | --- |
| 1,726,055 | Campbell | Aug. 27, 1929 |
| 1,760,879 | Maynard | June 3, 1930 |
| 2,161,308 | Murphy et al. | June 6, 1939 |
| 2,164,058 | Fowler | June 27, 1939 |
| 2,189,966 | Spanel | Feb. 13, 1940 |
| 2,324,735 | Spanel | July 20, 1943 |
| 2,393,298 | DeLaney et al. | Jan. 22, 1946 |
| 2,412,429 | Slingluff | Dec. 10, 1946 |

Certificate of Correction

Patent No. 2,478,599                                     August 9, 1949

ABRAHAM N. SPANEL

It is hereby certified that errors appear in the printed specification of the above numbered patent requiring correction as follows:

Column 2, line 15, for the word "surface" read *surfaces*; line 19, for "number" read *member*; line 35, for "operations" read *operation*; column 3, line 59, after "deposited" insert *as by laying*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*